United States Patent
Kasiraj et al.

(10) Patent No.: US 7,057,862 B2
(45) Date of Patent: Jun. 6, 2006

(54) CURRENT-PERPENDICULAR-TO-PLANE-MAGNETORESISTIVE SENSOR WITH FREE LAYER STABILIZED AGAINST VORTEX MAGNETIC DOMAINS GENERATED BY THE SENSE CURRENT

(75) Inventors: Prakash Kasiraj, San Jose, CA (US); Stefan Maat, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 362 days.

(21) Appl. No.: 10/776,484

(22) Filed: Feb. 10, 2004

(65) Prior Publication Data

US 2005/0174701 A1    Aug. 11, 2005

(51) Int. Cl.
*G11B 5/33* (2006.01)

(52) U.S. Cl. .................................. 360/324.12
(58) Field of Classification Search ............. 360/324.1, 360/324.11, 324.12, 324.2
See application file for complete search history.

(56) References Cited

U.S. PATENT DOCUMENTS

| | | | |
|---|---|---|---|
| 5,729,410 | A | 3/1998 | Fontana, Jr. et al. |
| 6,023,395 | A | 2/2000 | Dill et al. |
| 6,473,279 | B1 | 10/2002 | Smith et al. |

OTHER PUBLICATIONS

Tanaka et al., "Spin-valve heads in the current-perpendicular-to-plane mode for ultrahigh-density recording", IEEE Transactions on Magnetics, 38 (1): 84-88 Part 1 Jan. 2002.

*Primary Examiner*—A. J. Heinz
*Assistant Examiner*—Mark Blouin
(74) *Attorney, Agent, or Firm*—Thomas R. Berthold

(57) ABSTRACT

A current-perpendicular-to-the-plane (CPP) magnetoresistive sensor has additional layers for stabilizing the free layer against sense-current-generated magnetic fields. A ferromagnetic stabilizing layer is spaced from the free layer by a spacer layer and is exchange coupled with a second antiferromagnetic layer, the first antiferromagnetic layer being the conventional one for pinning the pinned layer in the CPP sensor. The stabilizing layer is in a vortex or other non-longitudinal magnetization pattern that is fixed by exchange coupling with the second antiferromagnetic layer. The stabilizing layer is also ferromagnetically coupled to the free layer across the spacer layer so that in the absence of both a sense current and an external magnetic field, the free and stabilization layers have similarly shaped vortex or other non-longitudinal magnetization patterns. The sense current generates a vortex magnetic field in the free layer opposite to the fixed vortex magnetization pattern in the stabilizing layer and essentially erases the effect of the vortex magnetization pattern in the free layer.

17 Claims, 2 Drawing Sheets

CURRENT-PERPENDICULAR-TO-PLANE-MAGNETORESISTIVE SENSOR WITH FREE LAYER STABILIZED AGAINST VORTEX MAGNETIC DOMAINS GENERATED BY THE SENSE CURRENT

TECHNICAL FIELD

The invention relates to a current-perpendicular-to-the-plane (CPP) magnetoresistive sensor that operates with the sense current directed perpendicularly to the planes of the layers making up the sensor stack.

BACKGROUND OF THE INVENTION

One type of conventional magnetoresistive sensor, often called a "spin-valve" (SV) sensor, has a stack of layers that include two ferromagnetic layers separated by a nonmagnetic spacer layer. One ferromagnetic layer has its magnetization direction fixed, such as by being pinned by exchange coupling with an adjacent antiferromagnetic layer, and the other ferromagnetic layer has its magnetization direction "free" to rotate in the presence of an external magnetic field. With a sense current applied to the sensor, the rotation of the free-layer magnetization relative to the fixed-layer magnetization is detectable as a change in electrical resistance. The SV type of magnetoresistive sensor typically operates with the sense current directed parallel to the planes of the layers in the sensor layer stack, so it is referred to as a current-in-the-plane (CIP) sensor. In a disk drive CIP-SV read sensor or head, the magnetization of the fixed or pinned layer is generally perpendicular to the plane of the disk, and the magnetization of the free layer is generally parallel to the plane of the disk in the absence of an external magnetic field. When exposed to an external magnetic field from the recorded data on the disk, the free-layer magnetization will rotate, causing a change in electrical resistance.

A SV type of magnetoresistive sensor has been proposed that operates with sense current perpendicular to the planes (CPP) of the layers in the sensor stack. CPP-SV read heads are described by A. Tanaka et al., "Spin-valve heads in the current-perpendicular-to-plane mode for ultrahigh-density recording", *IEEE TRANSACTIONS ON MAGNETICS*, 38 (1): 84-88 Part 1 January 2002. Another type of CPP sensor is a magnetic tunnel junction (MTJ) sensor in which the nonmagnetic spacer layer is a very thin nonmagnetic insulating tunnel barrier layer. In a MTJ sensor the tunneling current perpendicularly through the layers depends on the relative orientation of the magnetizations in the two ferromagnetic layers. While in a MTJ magnetoresistive read head the spacer layer is electrically insulating and is typically alumina ($Al_2O_3$), in a CPP-SV magnetoresistive read head the spacer layer is electrically conductive and is typically copper.

For maximum read-head stability and response-linearity without hysteresis in all, CIP-SV, CPP-SV and MTJ read heads, the magnetization of the free layer should be maintained in a saturated single domain state in the absence of an external magnetic field. In such a state, the local magnetization everywhere in the free layer, including the ends or side edges, is essentially "longitudinal", i.e., along the length of the free layer and the cross-track direction of the head and parallel to the plane of the magnetic recording medium. Ferromagnetic biasing layers are typically used to achieve longitudinal biasing of the free layer. U.S. Pat. No. 5,729,410 describes a MTJ sensor with longitudinal biasing layers located outside the sensor stack near the free layer side edges but spaced from the free layer side edges by insulating material. U.S. Pat. Nos. 6,023,395 and 6,473,279 describe CPP sensors with longitudinal biasing layers located in the sensor stack.

CPP sensors, even if they have longitudinally biased free layers, suffer from an additional problem affecting stabilization of the free-layer magnetization. The magnetic field generated by the sense current flowing perpendicularly through the free layer causes the magnetic moments in the free layer to rotate away from the direction of the bias field which may result in free layer instabilities. A high sense-current density, which is desirable for a higher signal, generates higher magnetic fields in the free layer and thus greater instability in the free-layer magnetization. For example, a uniform current density distribution through the free layer with sense-current-generated fields exceeding the longitudinal bias field and the free layer anisotropy field will generate a vortex magnetic domain state instead of a single longitudinally-oriented magnetic domain state. Another example is an asymmetric current density distribution through the free layer with sense-current-generated-fields that locally exceed the longitudinal bias field and the free layer anisotropy field. This may cause the formation of a highly non-uniform domain state in the free layer, which results in undesirable self-biasing of the sensor.

What is needed is a CPP magnetoresistive sensor that has a free-layer with a magnetization stabilized in a single longitudinal magnetic domain, even in the presence of a high-density sense current.

SUMMARY OF THE INVENTION

The invention is a CPP magnetoresistive sensor with additional layers for stabilizing the free layer against sense-current-generated magnetic fields. A ferromagnetic stabilizing layer is spaced from the free layer by a spacer layer and is exchange coupled with a second antiferromagnetic layer, the first antiferromagnetic layer being the conventional one for pinning the pinned layer in the CPP sensor. The stabilizing layer is in a vortex or other non-longitudinal magnetization pattern, in the following simply referred to as a vortex magnetization pattern. This vortex magnetization pattern of the stabilizing layer is fixed by exchange coupling with the second antiferromagnetic layer. Moreover, the stabilizing layer is ferromagnetically coupled to the free layer across the spacer layer so that in the absence of both a sense current and an external magnetic field, the free and stabilization layers have similarly shaped vortex or other non-longitudinal magnetization patterns.

In operation of the CPP sensor, the sense current generates a vortex magnetic field in the free layer in a generally circular direction opposite to the direction of the fixed vortex magnetization pattern in the stabilizing layer. This sense-current-generated field essentially counteracts the vortex magnetization pattern and essentially "erases" the effect of the vortex magnetization pattern in the free layer. The result is that the preferred single-domain longitudinal magnetization in the free layer is not adversely affected, and the free layer can respond to the magnetic transitions on the recording medium as substantially a single magnetic domain.

An important requirement of the CPP sensor is that the second antiferromagnetic layer exhibits a blocking temperature $T_{BL}$ lower than the blocking temperature $T_{BH}$ of the first antiferromagnetic layer. The CPP sensor is fabricated by raising the temperature to above $T_{BH}$ in the presence of an externally applied longitudinal magnetic field to set the magnetization direction of the sensor's pinned layer. After the temperature is decreased to below $T_{BH}$ and the externally applied magnetic field is removed the pinned layer has its magnetization fixed by being exchange coupled to the first antiferromagnetic layer. The temperature is then raised to above $T_{BL}$ but below $T_{BH}$. A setting current of about the same value as the sense current is then applied perpendicularly through the stack of sensor layers and opposite to the direction the sense current will be applied in the completed sensor. This setting current generates a magnetic field with a generally vortex configuration that will cause the free layer and the stabilization layer to form a vortex or other non-longitudinal magnetization pattern. The structure is then cooled to below $T_{BL}$ in the presence of the setting current. This causes the stabilizing layer to become exchange coupled with the second antiferromagnetic layer, resulting in the spatial fixing of the vortex or other non-longitudinal magnetization pattern in the stabilizing layer. Since the stabilizing layer is ferromagnetically coupled to the free layer across the spacer layer, the free layer will have a similarly shaped vortex magnetization pattern. Thus after fabrication of the structure and in the absence of a sense current, the free layer will have a vortex magnetization pattern held in place as a result of the ferromagnetic coupling to the stabilizing layer across the spacer layer.

For a fuller understanding of the nature and advantages of the present invention, reference should be made to the following detailed description taken together with the accompanying figures.

DETAILED DESCRIPTION OF THE INVENTION

Prior Art

Figure 1:
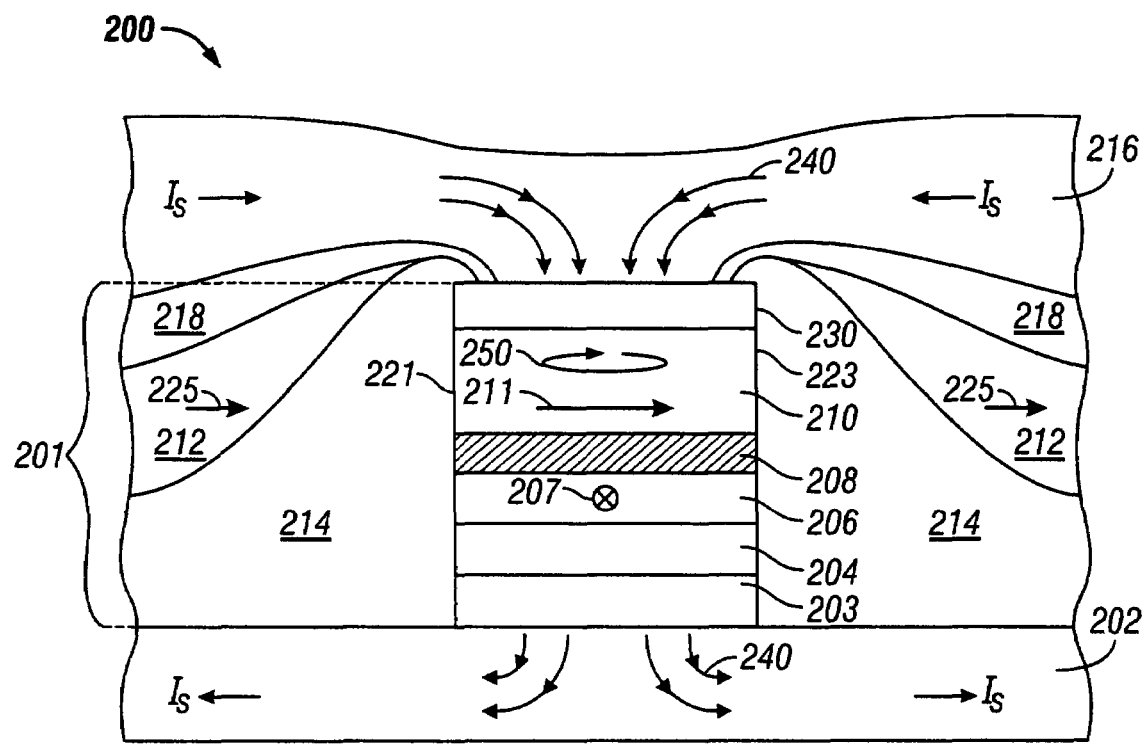
FIG. 1 is a cross-sectional view a conventional prior art CPP sensor.

FIG. 1 is a sectional view of a prior art CPP sensor 200. Sensor 200 comprises a stack 201 of layers formed on a substrate 202, which in the case of a read head is the bottom magnetic shield that also serves as the bottom electrical lead. A top magnetic shield 216 on stack 201 also serves as the top electrical lead. The layers in stack 201 include a pinned ferromagnetic layer 206 having a fixed magnetic moment or magnetization direction 207 oriented transversely (into the page), a free ferromagnetic layer 210 having a magnetic moment or magnetization vector 211 that can rotate in the plane of layer 210 in response to transverse external magnetic fields, and a nonmagnetic spacer layer 208 between the pinned layer 206 and free layer 210. The pinned layer 206 is exchange coupled with an antiferromagnetic layer 204 that is formed on a suitable seed layer or underlayer 203 on substrate 202. Thus the magnetization direction 207 of pinned layer 206 is fixed and will not rotate in the presence of an external magnetic field in the range of interest, i.e., magnetic fields from recorded data. For a CPP-SV sensor, the spacer layer 208 is electrically conductive, and is typically formed of copper. For a MTJ sensor, the spacer layer 208 is an electrically insulating tunnel barrier layer, and is typically alumina ($Al_2O_3$). A capping layer 230, typically formed of Ta or Ru may be formed on top of free layer 210. The pinned and free layers are typically formed of an alloy of one or more of Co, Fe and Ni, or a bilayer of two alloys, such as a CoFe—NiFe bilayer. The antiferromagnetic layer 204 is typically made of FeMn, PtMn, NiMn, PdPtMn, RhMn, CrPtMn, FeRhMn or IrMn. The magnetic shields/electrical leads 202, 216 are typically formed of permalloy (NiFe) or sendust (FeAlSi).

The sensor 200 includes longitudinal biasing layers 212 outside the sensor stack near the side edges 221, 223 of free layer 210. The biasing layers 212 may be formed of hard ferromagnetic material, such as CoPt or CoCrPt, and are electrically insulated from the sensor stack and the top shield/electrical lead 216 by insulating layers 214 and 218, respectively. The biasing layers 212 provide a longitudinal biasing magnetic field, as shown by arrows 225, to stabilize the magnetization of the free layer 210 longitudinally in the direction 211 along the length of the free layer.

Figure 2:
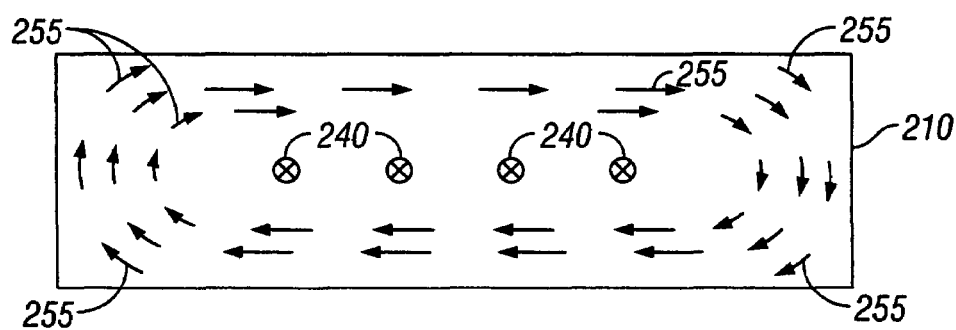
FIG. 2 is a schematic representation of the vortex magnetization pattern in the CPP sensor free layer caused by the sense current.

A sense current $I_S$ is directed perpendicularly through the stack 201, as shown by arrows 240. The sense current inherently generates a magnetic field 250, which is sometimes referred to as Oersted field and is generally shaped as a vortex in the free layer 210. For a constant current density j through a circular disc of free layer material, j=U/RA, where U is the voltage drop across the free layer and RA is the resistance-area product of the free layer, the magnetic flux density generated by the sense-current is proportional to U*r/RA, where r is the radius of the disc. Therefore the highest flux density caused by the sense current is at the perimeter of the free layer. The same trend holds for a free layer with a rectangular cross-section. The Oersted field is undesirable because it tends to cause a vortex or other non-longitudinal magnetization pattern inside the free layer for high current densities. This detracts from the desired longitudinally-oriented single magnetic domain represented by arrow 211. This problem is depicted schematically in FIG. 2, which shows the free layer 210 from the top and the free layer magnetic moments 255 forming a non-longitudinally-oriented vortex magnetization pattern as a result of the sense current flowing perpendicularly through free layer 210 in the direction shown by arrow tails 240 (into the paper). In the case of an asymmetric current density distribution through the free layer, the Oersted field may cause a highly non-uniform domain state, which results in undesirable self biasing of the sensor.

The Invention

Figure 3:
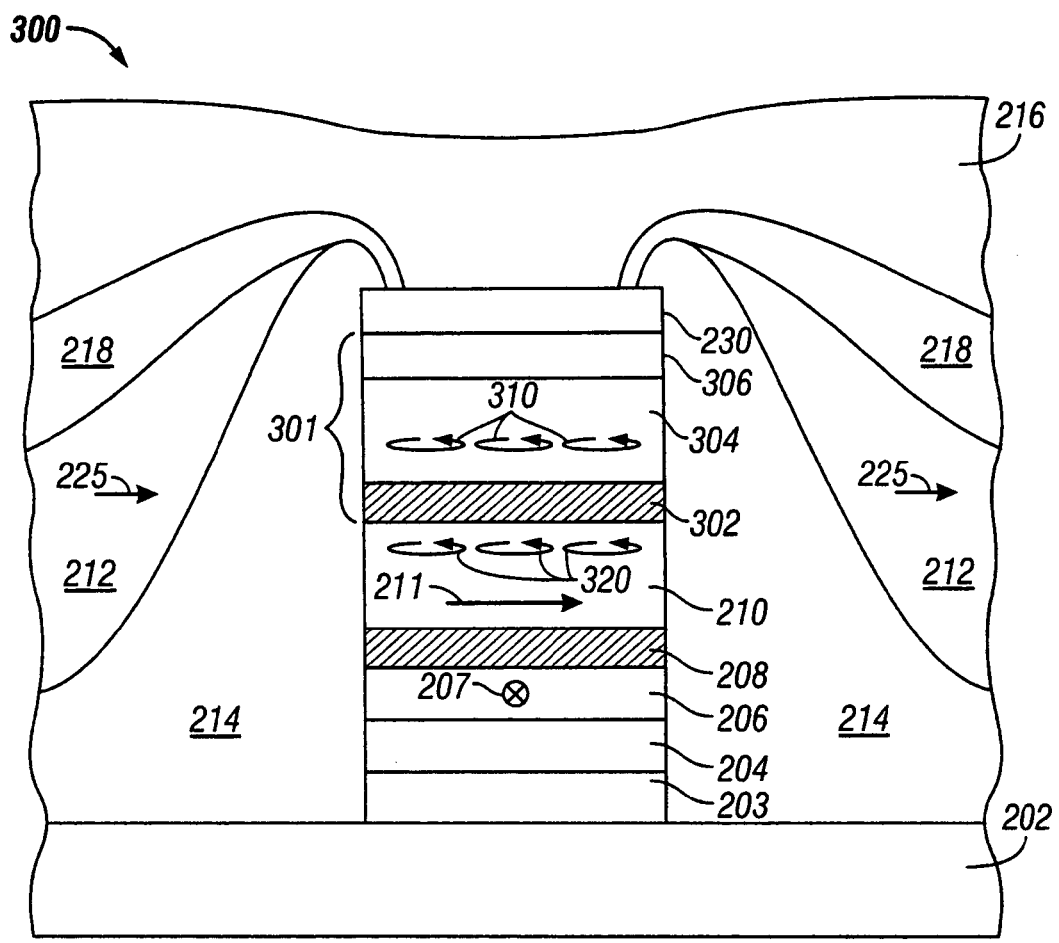
FIG. 3 is a cross-sectional view of the CPP sensor of the present invention representing the fixed vortex magnetization pattern in the free layer in the absence of a sense current.

FIG. 3 is a sectional view of the CPP sensor 300 of the present invention and is depicted in the absence of a sense current. It is substantially identical structurally to the sensor 200, with the exception of a set 301 of layers 302, 304, 306 located between the free layer 210 and the capping layer 230. Layer 304 is a ferromagnetic layer for stabilizing free layer 210 and is spaced from free layer 210 by a second nonmagnetic spacer layer 302. Layer 306 is a second antiferromagnetic layer for fixing the magnetization of stabilizing layer 304 by exchange coupling. Free layer 210 is thus located between first spacer layer 208 and second spacer layer 302.

The magnetic domains, represented by arrows 310, within the stabilizing layer 304 form a vortex or other non-longitudinal magnetization pattern that is fixed by unidirectional exchange coupling with antiferromagnetic layer 306. In the absence of both a sense current and an external magnetic field, these magnetic domains 310 are ferromagnetically coupled across spacer layer 304 with similarly shaped magnetic domains, represented by arrows 320, in free layer 210 (as shown in FIG. 3).

Generally magnetic coupling may be either ferromagnetic or antiferromagnetic. The type and strength of the coupling depends on the type and crystallographic texture of the ferromagnetic material in the free layer 210 and stabilizing layer 304, and the type, crystallographic texture, and thickness of the material forming the spacer layer 304. The spacer layer 304 is formed of a nonmagnetic transition metal, such as ruthenium (Ru), chromium (Cr), rhodium (Rh), iridium (Ir) or copper (Cu), vanadium (V), niobium (Nb) or alloys of these materials. The exchange coupling of ferromagnetic films via a nonmagnetic transition metal spacer film has been extensively studied and described. In general, the exchange coupling oscillates from ferromagnetic to antiferromagnetic with increasing spacer film thickness. This oscillatory coupling relationship for selected material combinations is described by Parkin et al. in "Oscillations in Exchange Coupling and Magnetoresistance in Metallic Superlattice Structures: Co/Ru, Co/Cr and Fe/Cr", *Phys. Rev. Lett.*, Vol. 64, p. 2034 (1990) and Parkin et al. in "Systematic Variation of the Strength and Oscillation Period of Indirect Magnetic Exchange coupling through the 3d, 4d, and 5d transition metals", *Phys. Rev. Lett.*, Vol. 67, 3598 (1991). The material combinations include ferromagnetic films made of Co, Fe, Ni, and their alloys, such as Ni80-Fe20 and Ni80-Co20, and nonmagnetic spacer films such as ruthenium (Ru), chromium (Cr), rhodium (Rh), iridium (Ir), copper (Cu). For each such material combination, the oscillatory exchange coupling relationship has to be determined, if not already known, so that the thickness of the nonmagnetic spacer film is selected to assure either antiferromagnetic or ferromagnetic coupling between the two ferromagnetic films. The period of oscillation depends on the nonmagnetic spacer material, but the strength and phase of the oscillatory coupling also depends on the ferromagnetic material and interfacial quality.

Figure 4:
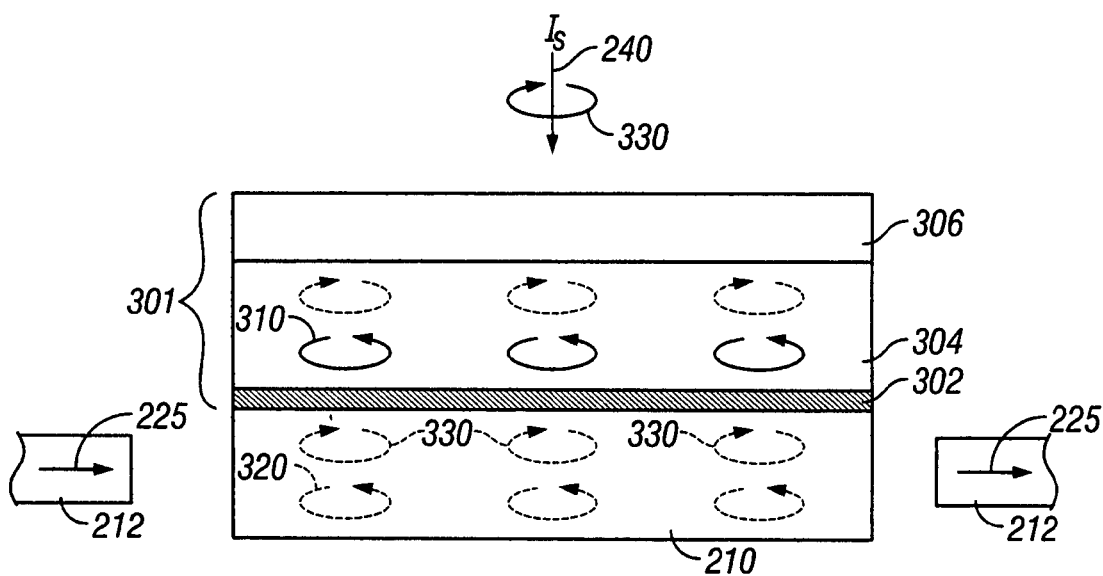
FIG. 4 is a schematic representation of the effect of the magnetic field caused by the sense current on the vortex magnetization pattern of the free layer and the stabilizing layer in a CPP sensor of the present invention.

FIG. 4 shows the effect of a sense current is directed perpendicularly through the stabilizing layer 304 and free layer 210. The sense current generates a vortex magnetic field 330 in the free layer 210 in a generally circular direction opposite to the direction of the fixed vortex magnetic domains 320. This field essentially counteracts the vortex magnetic domains 320 (now represented by dashed lines in FIG. 4) and essentially "erases" the effect of the vortex magnetic domains in free layer 210, with the result that the preferred single-domain longitudinal magnetization in free layer 210 is recovered. The sense current also generates a magnetic field 330 in the stabilizing layer 304, but because the exchange coupling between stabilizing layer 304 and the second antiferromagnetic layer 306 is strong enough, the sense current will not affect the vortex magnetization pattern 310 (still represented as solid lines in FIG. 4).

Because the magnetic fields generated by the sense current are now offset by the fields from the vortex magnetization pattern in free layer 210, the magnetization direction of free layer 210 is dominated by its own anisotropy and by the longitudinal biasing from layers 212. Thus the free layer 210 can respond to the magnetic transitions on the recording medium as substantially a single magnetic domain.

Referring again to FIG. 3, the method for manufacturing the CPP sensor of the present invention will now be described. The structure is fabricated in the conventional manner, using deposition, lithographic, ion milling, reactive ion etching and other fabrication techniques well-known for conventional SV and MTJ sensors. An important requirement, however, is that the second antiferromagnetic layer 306 exhibits a blocking temperature $T_{BL}$ lower than the blocking temperature $T_{BH}$ of the first antiferromagnetic layer 204. The blocking temperature of a magnetic material is the temperature at which the net magnetic moment no longer has a fixed orientation. In the case of a ferromagnetic/antiferromagnetic bilayer, such as bilayers 204/206 and 304/306, the blocking temperature is the temperature at which the exchange bias field between the two layers vanishes. Thus the antiferromagnetic layers 204, 306 can be formed of different materials, or they can be formed of substantially the same material, but with different thicknesses. If IrMn is the chosen antiferromagnetic material for both layers, then if layer 204 is approximately 80 Angstrom thick and layer 306 is approximately 200 Angstrom thick, then $T_{BH}$ would be approximately 140° C. and $T_{BL}$ would be approximately 230° C.

During or after fabrication of the structure, the temperature is raised to above $T_{BH}$ and the structure is exposed to an externally applied longitudinal magnetic field in the direction 207 to set the magnetization direction of pinned layer 206. After the temperature is decreased to below $T_{BH}$ and the externally applied magnetic field is removed the pinned layer 206 has its magnetization fixed in the direction 207 by being exchange coupled to the first antiferromagnetic layer 204. Next the temperature is raised to above $T_{BL}$ but below $T_{BH}$. A setting current of about the same value as the sense current is then applied perpendicularly through the structure in a direction opposite to the direction the sense current will be applied in the completed sensor, i.e. opposite to the direction 240 in FIGS. 3 and 4. This setting current generates a magnetic field with a generally vortex configuration that will cause the free layer 210 and the stabilizing layer 304 to form a vortex or other non-longitudinal magnetization pattern to form in free layer 210 in the direction shown by arrows 320 in FIG. 3. The structure is then cooled to below $T_{BL}$ in the presence of the setting current. This causes the stabilizing layer 304 to become exchange coupled with the second antiferromagnetic layer 306, resulting in the spatial fixing of the vortex or other non-longitudinal magnetization pattern in stabilizing layer 304. Thus after fabrication of the structure and in the absence of a sense current, the free layer 210 will have a vortex or other non-longitudinal magnetization pattern 320 held in place as a result of the magnetic coupling to stabilizing layer 304 across the spacing layer 302.

While the structure shown in FIG. 3 has the pinned ferromagnetic layer 206 below the free layer 210, these layers could be reversed, in which case the stack 301 would be located between the substrate 202 and the free layer 210 with the order of the layers in stack 301 also being reversed, i.e., spacer layer 302 would be located between stabilizing layer 304 and free layer 210. Also, the pinned layer 206 can be the well-known antiparallel-pinned (AP-pinned) structure. This structure minimizes magnetostatic coupling of the pinned layer 206 with the free layer 210. The AP-pinned structure comprises a ferromagnetic pinned layer, a nonmagnetic spacer layer and a ferromagnetic reference layer.

Also, while the CPP sensor in FIG. 3 is shown with a design wherein the sense current is from "top" to "bottom", the CPP sensor can be designed with the sense current going from bottom to top, in which case the direction of the setting current during fabrication would be reversed from that described above.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetoresistive sensor comprising a stack of layers and capable of sensing external magnetic fields when a sense current is applied perpendicular to the planes of the layers in the stack, the stack of layers including:
    a first nonmagnetic spacer layer;
    a second nonmagnetic spacer layer;
    a free ferromagnetic layer between the first and second spacer layers and having a magnetization direction oriented substantially longitudinally along the length of the layer in the absence of an external magnetic field, said free layer magnetization direction being substantially free to rotate in the presence of an external magnetic field in the range of interest;
    a pinned ferromagnetic layer adjacent the first spacer layer and having a magnetization direction oriented in a preferred direction;
    a first antiferromagnetic layer exchange coupled to the pinned layer and preventing substantial rotation of the magnetization of the pinned layer in the presence of an external magnetic field in the range of interest;
    a ferromagnetic stabilizing layer adjacent the second spacer layer; and
    a second antiferromagnetic layer exchange coupled to the stabilizing layer, the second antiferromagnetic layer having a blocking temperature less than the blocking temperature of the first antiferromagnetic layer, the stabilizing layer and the free layer having nonlongitudinally-oriented magnetic domains magnetically-coupled across the second spacer layer in the absence of an external magnetic field and the absence of a sense current.

2. The sensor according to claim 1 wherein the stabilizing layer and the free layer are ferromagnetically coupled across the second spacer layer.

3. The sensor according to claim 1 wherein the nonlongitudinally-oriented magnetically-coupled magnetic domains of the stabilizing layer and the free layer are oriented generally as a vortex magnetization pattern within the free layer.

4. The sensor according to claim 1 wherein the free layer has substantially fewer nonlongitudinally-oriented magnetic domains in the presence of a sense current.

5. The sensor according to claim 1 wherein the first nonmagnetic spacer layer is electrically conducting.

6. The sensor according to claim 1 wherein the sensor is a magnetic tunnel junction and wherein the first nonmagnetic spacer layer is electrically insulating.

7. The sensor according to claim 1 wherein the second spacer layer is formed of a material selected from the group consisting of ruthenium (Ru), chromium (Cr), rhodium (Rh), iridium (kr), copper (Cu), vanadium (V), niobium (Nb) and their alloys.

8. The sensor according to claim 1 wherein each of the first and second antiferromagnetic layers is formed of a material selected from the group consisting of FeMn, PtMn, NiMn, PdPtMn, RhMn, CrPtMn, FeRhMn and IrMn.

9. The sensor according to claim 8 wherein each of the first and second antiferromagnetic layers is formed of substantially the same material, the thickness of the second antiferromagnetic layer being less than the thickness of the first antiferromagnetic layer.

10. The sensor according to claim 1 further comprising a ferromagnetic biasing layer outside the stack near each side edge of the free layer for longitudinally biasing the magnetization direction of the free layer along its length.

11. A current-perpendicular-to-the-plane spin-valve magnetoresistive read head for sensing data recorded on a magnetic recording medium when a sense current is applied to the head, the head comprising:
    a substrate;
    a first antiferromagnetic layer on the substrate:
    a pinned ferromagnetic layer exchange coupled to the first antiferromagnetic layer and having a magnetization direction oriented substantially perpendicular to the plane of the recording medium and substantially prevented from rotating in the presence of magnetic fields from the recording medium;
    a first electrically-conducting nonmagnetic spacer layer on the pinned layer;
    a free ferromagnetic layer on the first nonmagnetic spacer layer and having a magnetization direction oriented substantially parallel to the plane of the recording medium in the absence of an external magnetic field, said free layer magnetization direction being substantially free to rotate in the presence of magnetic fields from the recording medium;
    a second nonmagnetic spacer layer on the free layer;
    a ferromagnetic stabilizing layer on the second spacer layer, the stabilizing layer and the free layer having nonlongitudinally-oriented magnetic domains ferromagnetically coupled across the second spacer layer in the absence of an external magnetic field and the absence of a sense current; and
    a second antiferromagnetic layer on and exchange coupled to the stabilizing layer and substantially fixing the orientation of the nonlongitudinally-oriented magnetic domains in the stabilizing layer in the absence of an external magnetic field and the absence of a sense current, the second antiferromagnetic layer having a blocking temperature less than the blocking temperature of the first antiferromagnetic layer.

12. The head according to claim 11 wherein the nonlongitudinally-oriented magnetically-coupled magnetic domains of the stabilizing layer and the free layer are oriented generally as a vortex magnetization pattern within the free layer.

13. The head according to claim 11 wherein the free layer has substantially fewer nonlongitudinally-oriented magnetic domains in the presence of a sense current.

14. The head according to claim 11 wherein the second spacer layer is formed of a material selected from the group consisting of ruthenium (Ru), chromium (Cr), rhodium (Rh), iridium (Ir), copper (Cu), vanadium (V), niobium (Nb) and their alloys.

15. The head according to claim 11 wherein each of the first and second antiferromagnetic layers is formed of a material selected from the group consisting of FeMn, PtMn, NiMn, PdPtMn, RhMn, CrPtMn, FeRhMn or IrMn.

16. The head according to claim 15 wherein each of the first and second antiferromagnetic layers is formed of substantially the same material, the thickness of the second antiferromagnetic layer being less than the thickness of the first antiferromagnetic layer.

17. A method for making a current-perpendicular-to-the-plane magnetoresistive sensor comprising:

depositing on a substrate a first layer of antiferromagnetic material, a first layer of ferromagnetic material in contact with the first layer of antiferromagnetic material, a first spacer layer of nonmagnetic material in contact with the first layer of ferromagnetic material, a second layer of ferromagnetic material in contact with the first spacer layer, a second spacer layer of nonmagnetic material in contact with the second layer of ferromagnetic material, a third layer of ferromagnetic material in contact with the second spacer layer, and a second layer of antiferromagnetic material in contact with the third layer of ferromagnetic material and having a blocking temperature $T_{BL}$ less than the blocking temperature $T_{BH}$ of the first antiferromagnetic material;

setting the magnetization direction of the first layer of ferromagnetic material in a first direction, said magnetization of the first layer of ferromagnetic material being pinned by exchange coupling with the first layer of antiferromagnetic material;

applying a setting current in a direction substantially perpendicular to all of said layers in the presence of a temperature above $T_{BL}$ but below $T_{BH}$ to generate a vortex magnetic field in the third ferromagnetic layer; and reducing the temperature to below $T_{BL}$ while the setting current is applied to cause the magnetization generated in the third ferromagnetic layer by said vortex magnetic field to be fixed by exchange coupling with the second layer of antiferromagnetic material.

* * * * *